Aug. 17, 1943.     V. R. DESPARD     2,326,841
OUTLET BOX CLAMP
Filed April 3, 1941
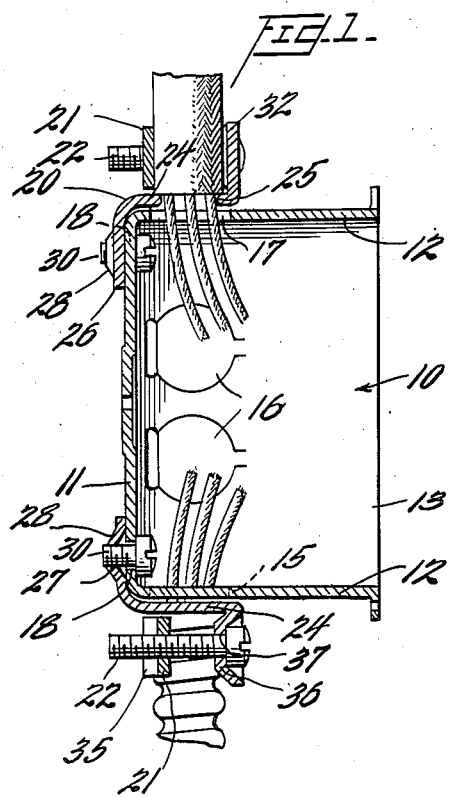
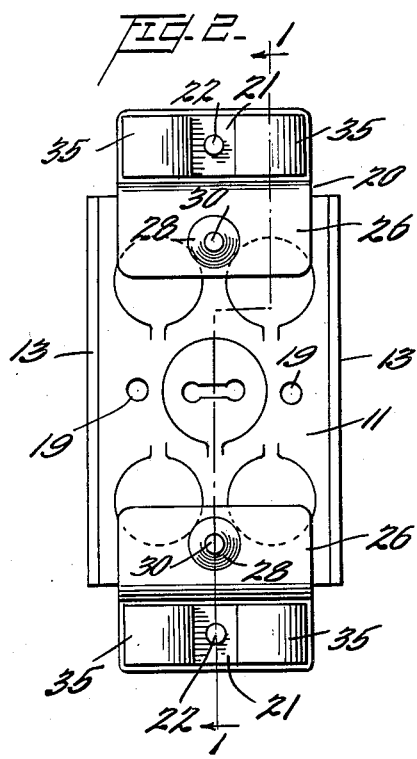
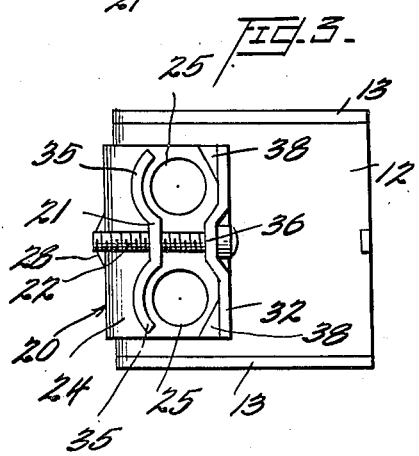
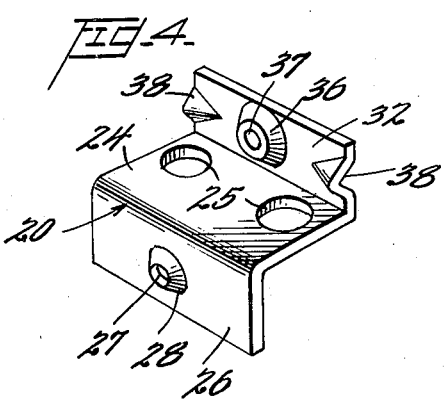
Inventor
Victor R. Despard
By Watson, Cole, Grindle & Watson
Attorney Patented Aug. 17, 1943

2,326,841

UNITED STATES PATENT OFFICE 2,326,841

OUTLET BOX CLAMP

Victor R. Despard, Syracuse, N. Y., assignor to Pass & Seymour, Inc., Syracuse, N. Y., a corporation of New York Application April 3, 1941, Serial No. 386,723

6 Claims. (Cl. 285—25)

This invention relates to cable clamps for outlet, wall, or switch boxes and primarily to outside cable clamps as attachments for conventional boxes of the type referred to.

It is the general object of the present invention to provide novel and improved outside cable clamps for wall, outlet, or switch boxes which do not require any alterations in the boxes even though they may have been constructed for use with inside clamps.

More particularly it is an object of the invention to provide, in accessory form, an outside cable clamp assembly adapted to be readily attached at any one of various positions on a conventional box and to provide sheath clamping facilities and cable sheath stop means in cooperative relationship with various knock-outs provided in the box.

Other and further features and objects of the invention will be more apparent to those skilled in the art upon a consideration of the accompanying drawing and following specification wherein is shown a single exemplary embodiment of the invention with the understanding that such changes and modifications may be made therein as fall within the scope of the appended claims without departing from the spirit of the invention.

In said drawing:

Figure 1 is a longitudinal, fore and aft section through a switch box equipped with two clamps constructed in accordance with the present invention, the clamps being arranged for cooperation with knock-outs in the end walls of the box, the section being taken on broken line 1—1 of Figure 2;

Figure 2 is a rear elevation of the box and mounted clamp assemblies of Figure 1;

Figure 3 is an end elevation showing one of the clamps mounted on a box; and

Figure 4 is a perspective view of the main clamp bracket.

In the wiring of houses and other buildings having finished walls it is the conventional practice, when installing flexible cables, to provide for making splices in such cables and for attaching wiring devices thereto to make use of so-called outlet, switch, or wall boxes formed of heavy sheet metal and rigidly supported on structural portions of the building.

The cables used for conducting the current comprise two or more individually insulated conductors enclosed in a flexible sheath which may be of insulation or of metal armoring, but in any event the underwriters' requirements and those of the city ordinances are such that the sheaths of the cables must be rigidly, mechanically clamped to the boxes in order to relieve any strains from the conductor splices or terminal connections to the wiring devices. Where the sheath is metallic, continuity of ground must be provided at the boxes for any cables that run through the same. Two general methods of providing this clamping have prevailed until recently. For use with cables of the so-called BX or spirally armored type, individual clamps were available having means for attaching them to the armor and having a nipple passing through an aperture in the box wall formed by the removal of the knockout. The clamp itself being larger than the nipple, forms a shoulder abutting the outer face of the box wall and the inner end of the nipple receives a lock nut for securing the whole device to the box.

Some boxes, however, are built with attached clamps, usually each comprising a sheet metal member articulated to the box by an adjusting screw and adapted to clamp the cable sheath against one of the box walls. These clamps are arranged inside of the box in order to accomplish their purpose, but recent regulations of the underwriters have restricted the number of conductors permitted to enter a box in accordance with the contents thereof. In counting the contents both the wiring devices and the inside clamps must be taken into consideration. Where several wiring devices such as multiple switches, convenience outlets and the like are to be mounted in a single gang box, these restrictions limit the full use of such devices because an adequate number of conductors cannot be brought in to serve them. If the cable clamps are outside of the box additional conductors are permitted to enter the same since the clamps do not occupy any box room or restrict the movement of conductors within the box.

It is therefore the purpose of the present invention to provide a novel form of outside clamp which can be sold as an accessory to be added to any conventional box and in particular those types only intended for use with inner clamps. The boxes can be bought with or without the inner clamps and clamps of the type provided by the present invention attached thereto by the simple use of a single screw for each clamp. Each of the clamps provides accommodation for two cables and has apertures therein for the passage of the conductors, the peripheries of the apertures serving as limiting stops to prevent the entrance of the cable sheaths within the box as further required by the underwriters.

Referring now to the drawing for a better understanding of the invention, there is shown at 10 a conventional form of switch box of the single-gang size, having a bottom wall 11 and integral end walls 12. The side walls 13 may be attached in any of the recognized manners, permitting, if desired, the multipling of boxes by the removal of intermediate walls as is now customary. Each end wall 12 is provided with a pair of knock-outs 15 closely adjacent the bottom wall and each side wall is provided with a similar pair 16 having the same lateral spacing as those in the end walls and also closely adjacent to the bottom wall. There are also a plurality of knock-outs in the bottom wall but these are of no particular interest from the standpoint of this invention. Each knock-out comprises a partially cut-through circular disk which can be easily knocked or pried out to leave an aperture such as 17 of a size to readily pass the sheath of a cable, as required with inside clamps. The bottom wall is also provided as shown at 18 with a pair of screw holes, one near each end and in the center of the width. These holes are threaded and normally receive the clamp screws of the customarily arranged internal cable clamps. Similar holes 19 are shown in the mid-length positions near the sides of the bottom wall. In the appended claims the expression "side wall" is intended to cover what have been referred to herein as side and end walls.

The cable clamp of the present invention comprises three parts, a bracket 20, a clamp element 21, and a clamping screw 22 securing the first two parts together adjustably.

The bracket 20 is of Z-bar shape and includes three sections formed integral with each other by two right angle bends in a substantial metal sheet. The intermediate section 24 is adapted to overlie an end or side wall of the box on the outside thereof and is provided with a pair of circular openings 25 of a size to pass the insulating conductors of the cable but not to pass the sheath. When in position the peripheries of the openings then provide stops for the sheath. The size, shape, and hole disposition of this section is such that when arranged against an end or side wall of the box the holes 25 correspond with the positions of the knock-outs in that wall of the box. One or both may be used as desired depending upon the number of cables required.

To position this intermediate member on the box a second and shorter member 26 constituting an arm of the Z and edge-connected to the intermediate member is provided and it has a central screw threaded opening 27 in the bottom of a conical depression 28. This second member is adapted to underlie a portion of the bottom wall of the box as clearly shown in Figures 1 and 2. A screw 30 passes through one of the openings 18 in the bottom wall of the box and engages in the threaded aperture 27 to rigidly fix the clamp assembly to the box. It will be noted that, by having the two members of the clamp just described overlying right-angled walls of the box, a single fastening screw holds the clamp bracket against movement in any direction. The screw is small enough to pass freely through the hole 18 in the box.

The third member 32 of each clamp bracket is edge-attached to the intermediate element, extends at right angles to the plane of the same but in the opposite direction from the second member 26, so that it extends at right angles to the wall of the box with which the intermediate member cooperates, and lies in a plane parallel to the bottom of the box. This also positions it parallel to the axis of the holes in the clamp member and in the cooperating wall of the box and it therefore forms a rigid wall for the clamp proper and cooperates with the parallel positioned clamping element 21 shown in plan in Figure 2 as a sheet of metal of generally rectangular configuration in plan but in edge elevation, as seen in Figure 3 having two curved portions 35 each one substantially concentric with one of the apertures 25 in the intermediate member of the clamp. These arcuate or cylindric sections serve to properly position the cable sheaths when cooperating with the intermediately positioned, raised boss 36 on the third member 32 of the clamp bracket. This boss is centrally perforated as at 37 for the passage of the clamping screw 22, the head of which is received within the hollow undersurface thereof as clearly seen in Figures 1 and 4. The screw is engaged in a threaded central opening in the clamp member 21 and serves to adjust it toward or from the part 26 as necessary to achieve the appropriate clamping pressure. To assist the arcuate portions 35 in the loose clamping element in preventing lateral movement of the cable sheaths, the member 32 of the clamp bracket may have the struck-up, inclined ridges 38 as clearly seen in Figures 3 and 4. These, together with the central boss 36, form a channel-like passage for the cable sheaths and the sharp edges of the parts 38 may serve to either indent the insulating type of sheath or fit between the convolutions of the metal armored type of sheath to better hold the cables against longitudinal movement.

It will be noted that access to all of the fastening elements associated with each clamp is from the front face of the box so that a clamp can readily be attached and the cables secured even after a box is mounted in position. Although the clamps are shown as associated with the end walls they can, in the same manner, be associated with the side walls of the box by merely passing the screws 30 through the openings 19 in the back wall instead of through the openings 18.

The advantages of this extremely simple arrangement of accessory clamps will be readily apparent to those skilled in the electric wiring art.

Having thus defined the invention, what is claimed as new and desired to be secured by Letters Patent, is:

1. A cable clamp fitting for an outlet box having a knock-out in a wall thereof near the bottom, comprising a bracket having an intermediate member adapted to overlie the outside of said wall surrounding the knock-out, said member having a conductor opening therein for alignment with the opening provided by removal of the knock-out and of such size that its periphery may act as a cable sheath stop, a second member edge-attached to the first and adapted to overlie the bottom of the box and be secured thereto, a third member extending from the opposite edge of the first and substantially at right angles to the plane thereof, a clamp element adapted for cooperation with said third member to engage the sheath of a cable whose conductors enter said openings, and a combined fastening and adjusting means connecting said element to and supporting the same from the third member.

2. An outside cable clamp fitting for an outlet or switch box having conventional knockouts comprising in combination, an integral metal plate bracket Z-shaped in section, a clamping element and a clamp screw, the middle section of the Z being adapted to overlie a wall of the box and having two conductor apertures spaced to align with knock-outs in said wall, one arm of the Z being adapted to underlie the bottom of the box, means to secure said arm to said bottom, and the second arm of the Z being arranged for cooperation with said clamping element and screw to tightly engage the sheaths of cables whose conductors pass through said apertures.

3. In an outlet box, in combination, a bottom wall, a side wall, a Z-shaped bracket overlying portions of both walls adjacent their intersection and having a member extending normal to the side wall and parallel to the bottom, a loose clamp element, and an adjusting screw holding said element in clamping relation to said member.

4. A cable clamp fitting as an accessory for a switch box comprising in combination, a bracket of Z-shape, the central member of the Z having conductor passages, one arm of the Z having means to receive a fastening for securing the same to a box, the other arm of the Z having a small aperture, a clamping screw entering said aperture and a clamping element mounted by said screw in confronting relation to said other arm.

5. The combination with an outlet box having a knock-out opening in a side wall, a cable clamp bracket including a part adapted to underlie a portion of the rear wall of the box and be secured thereto, a second part adapted to cover the said opening and having an aperture for cable conductors only, a third part having a cable channel in alignment with said opening, a clamping plate for cooperation with said third part, and a screw securing said plate adjustably to said third part.

6. A cable clamp fitting as an accessory for a switch or outlet box comprising in combination, a one-piece sheet metal bracket of substantially Z shape in section, the middle member of the Z having a pair of spaced conductor openings too small to pass a cable sheath, one arm of the Z being provided with a fastening for attachment to a box, the other arm of the Z having a central and perforated boss and pressed ridges adjacent the lateral edges cooperating with the boss to form cable channels spaced similarly to said openings to align conductors therewith, a clamp screw extending through said boss perforation, and a clamp plate threadedly engaged with said screw and positioned thereby to cooperate for clamping cables in said channels.

VICTOR R. DESPARD.